(12) United States Patent
Lee et al.

(10) Patent No.: US 9,825,326 B2
(45) Date of Patent: Nov. 21, 2017

(54) RECHARGEABLE BATTERY

(71) Applicant: SAMSUNG SDI CO., LTD., Yongin-si, Gyeonggi-do (KR)

(72) Inventors: Ji-Woon Lee, Yongin-si (KR);
Eun-Young Goh, Yongin-si (KR);
Sang-In Park, Yongin-si (KR);
Jin-Hyon Lee, Yongin-si (KR);
Sung-Yong Kim, Yongin-si (KR);
Jin-Seon Shin, Yongin-si (KR);
Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 235 days.

(21) Appl. No.: 14/838,338

(22) Filed: Aug. 27, 2015

(65) Prior Publication Data

US 2016/0126584 A1    May 5, 2016

(30) Foreign Application Priority Data

Oct. 30, 2014   (KR) ........................ 10-2014-0149443

(51) Int. Cl.
*H01M 2/02*   (2006.01)
*H01M 10/04*  (2006.01)
*H01M 10/0587* (2010.01)

(52) U.S. Cl.
CPC ....... *H01M 10/0431* (2013.01); *H01M 2/027* (2013.01); *H01M 2/0225* (2013.01); *H01M 2/0227* (2013.01); *H01M 10/0587* (2013.01); *H01M 2220/30* (2013.01)

(58) Field of Classification Search
CPC . H01M 2/027; H01M 2/0227; H01M 10/0431
USPC ............................................. 429/94
See application file for complete search history.

(56) References Cited

U.S. PATENT DOCUMENTS

| 2012/0308875 A1* | 12/2012 | Geshi ................. H01M 2/027 429/159 |
| 2015/0221925 A1* | 8/2015 | Kim .................... H01M 2/04 429/61 |

\* cited by examiner

*Primary Examiner* — Basia A Ridley
*Assistant Examiner* — James Erwin
(74) *Attorney, Agent, or Firm* — Lewis Roca Rothgerber Christie LLP (57) ABSTRACT

A rechargeable battery includes a wound electrode assembly having first and second electrodes at opposite surfaces of a separator; a first case accommodating a first side of the electrode assembly and being coupled to the first electrode; a second case accommodating a second side of the electrode assembly and coupled to the second electrode; and a gasket engaged by the electrode assembly and combined at the first and second openings to seal the first and second openings.

14 Claims, 11 Drawing Sheets

RECHARGEABLE BATTERY

CROSS-REFEENCE TO RELATED APPLICATION

This application claims priority to and the benefit of Korean Patent Application No. 10-2014-0149443 filed in the Korean Intellectual Property Office on Oct. 30, 2014, the entire contents of which are incorporated herein by reference.

BACKGROUND

1. Field

The present invention relates to a rechargeable battery.

2. Description of the Related Art

Rechargeable batteries can be classified into small-size cylindrical and prismatic types, large-sized prismatic types, etc., depending on their sizes and capacities.

As technology development and demand for mobile devices increases, demand for small-sized cylindrical and prismatic rechargeable batteries as an energy source have also been increasing.

With advancements in technology for mobile devices, peripheral devices such as a touch pen and a stylus pen having a diameter of several millimeters have been developed and used.

However, a rechargeable battery for use in such devices having an ultra-small diameter has not yet been developed.

A conventional cylindrical rechargeable battery typically includes an electrode assembly formed by disposing electrodes at opposite sides of a separator and then winding them in a jelly roll shape, a case for accommodating the electrode assembly, and a cap assembly for closing and sealing an opened side of the case.

Such a cylindrical rechargeable battery also typically includes electrode tabs for connecting to the cap assembly in the electrode assembly, and top and bottom insulators above and below the electrode assembly, thereby requiring a large number of parts.

Accordingly, the conventional cylindrical rechargeable battery is difficult to manufacture as a pin type having an ultra-small diameter.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a rechargeable battery that is formed as a pin type having an ultra-small diameter.

In addition, one aspect of the present invention provides a rechargeable battery that is capable of maximizing internal space utilization of a case by reducing the number of parts.

A rechargeable battery according to an exemplary embodiment of the present invention includes: an electrode assembly formed by disposing first and second electrodes at opposite surfaces of a separator and then winding them; a first case accommodating one side of the electrode assembly inserted into a first opening and coupled to the first electrode; a second case accommodating the other side of the electrode assembly inserted into a second opening and coupled to the second electrode; and a gasket penetrated by the electrode assembly, combined to the first and second openings facing each other, and sealing the first and second openings.

The first case may be coupled to the first electrode through a first tab, and the second case may be coupled to the second electrode through a second tab.

The first tab may be integrally formed with an uncoated region of the first electrode to be extended and bent such that it is coupled to an end portion of the first case where the first opening is formed, and the second tab may be integrally formed with an uncoated region of the second electrode to be extended and bent such that it is coupled to an end portion of the second case where the second opening is formed.

The gasket may include a first groove that is opened to face an end portion of the first case, and a second groove that is opened to face an end portion of the second case.

The first tab and the first case may be electrically coupled to each other in the first groove, and the second tab and the second case may be electrically coupled to each other in the second groove.

The gasket may further include a first conductive member in a first groove that is opened toward an end portion of the first case, and a second conductive member in a second groove that is opened toward an end portion of the second case.

The first tab and the first case may be electrically coupled to each other in the first groove while being supported by the first conductive member, and the second tab and the second case may be electrically coupled to each other in the second groove while being supported by the second conductive member.

The gasket may include a first groove that is formed to be stepped toward an end portion of the first case and lateral sides of the electrode assembly, and a second groove that is formed to be stepped toward an end portion of the second case and lateral sides of the electrode assembly.

The first tab and the first case may be electrically coupled to each other at bottom and lateral sides of the first groove, and the second tab and the second case may be electrically coupled to each other at bottom and lateral sides of the second groove.

The gasket may further include a first conductive member at a bottom of a first groove that is formed to be stepped toward an end portion of the first case and lateral sides of the electrode assembly, and a second conductive member at a bottom of a second groove that is formed to be stepped toward an end portion of the second case and the lateral sides of the electrode assembly.

The first tab and the first case may be electrically coupled to each other in the first groove while being supported by the bottom and the lateral sides thereof and the first conductive member, and the second tab and the second case may be electrically coupled to each other in the second groove while being supported by the bottom and the lateral sides thereof and the second conductive member.

The first tab may be bent multiple times at a lateral side of the electrode assembly to elastically contact an inner surface of the first case, and the second tab may be bent multiple times at the lateral side of the electrode assembly to elastically contact an inner surface of the second case.

The first case may be electrically coupled to the first tab through a first beading portion that is depressed toward a diametrical center, and the second case may be electrically coupled to the second tab through a second beading portion that is depressed toward the diametrical center.

A current collector of the first electrode may be formed of copper, a current collector of the second electrode is formed of aluminum, the first case is formed of stainless steel to contact a first tab of the first electrode, and the second case is formed of aluminum to contact a second tab of the second electrode.

As described above, according to the exemplary embodiment of the present invention, the first and second tabs coupled to the first and second electrodes of the electrode assembly are coupled to the first and second cases, and the first and second cases are combined to the gasket to seal the first and second openings of the first and second cases, thereby forming the pin type of rechargeable battery having the ultra-small diameter.

In addition, the first and second tabs are coupled to the first and second cases, the first and second openings of the first and second cases are combined to opposite sides of the gasket, and the first and second cases serve as electrode terminals, thereby reducing the number of parts of the rechargeable battery.

Due to reduction in the number of parts, the internal space use of the first and second cases can be enhanced.

DETAILED DESCRIPTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 1:
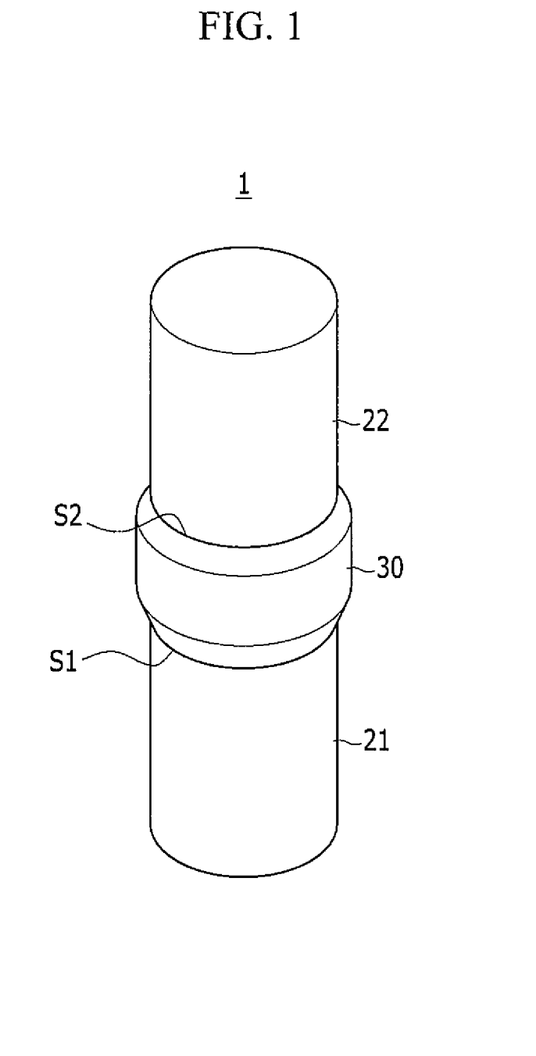
FIG. 1 is a perspective view of a rechargeable battery according to a first exemplary embodiment of the present invention.
Figure 2:
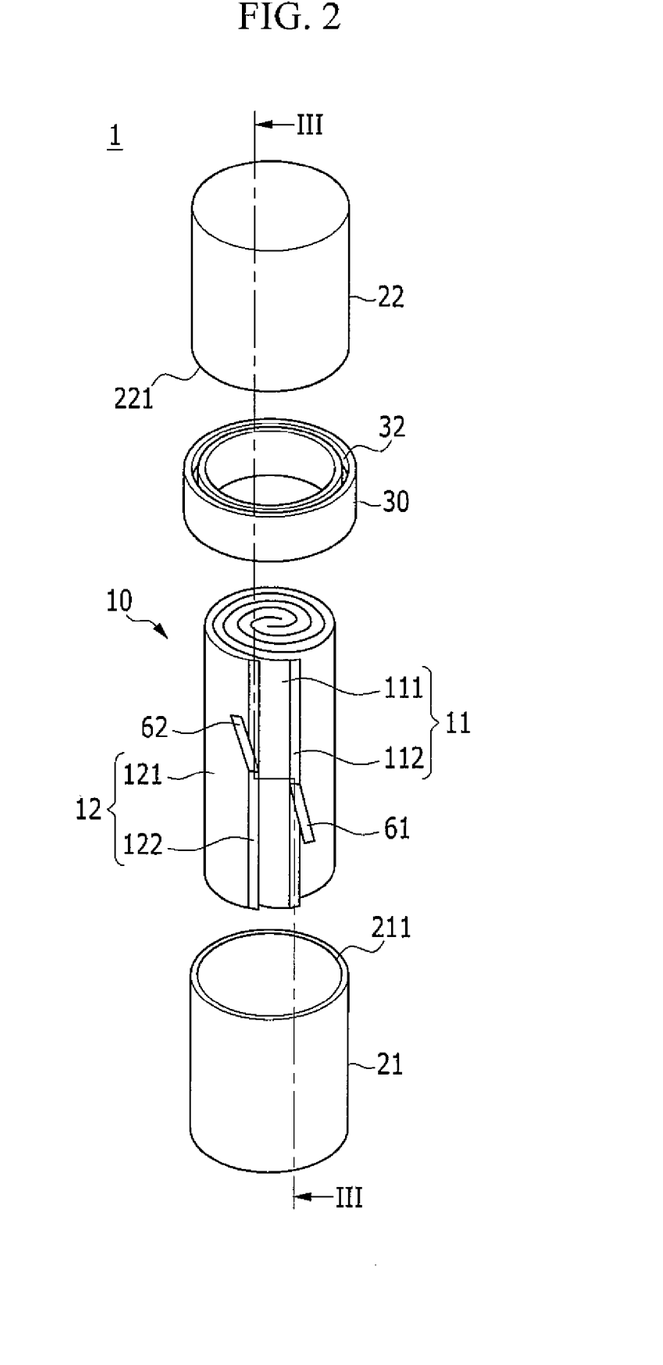
FIG. 2 is an exploded perspective view of FIG. 1.

FIG. 1 is a perspective view of a rechargeable battery according to a first exemplary embodiment of the present invention, and FIG. 2 is an exploded perspective view of FIG. 1.

Referring to FIGS. 1 and 2, the rechargeable battery 1 of the first exemplary embodiment is formed as a pin type having a diameter of several millimeters, and for example, may be formed to have a diameter of from about 2 mm to 5 mm.

The rechargeable battery 1 of the first exemplary embodiment includes: an electrode assembly 10 for performing charging and discharging operations; a first case 21 and a second case 22 electrically coupled to the electrode assembly 10 to accommodate the electrode assembly 10 at opposite sides thereof; and a gasket 30 combined to a first opening 211 and a second opening 221 of the first and second cases 21 and 22.

Figure 3:
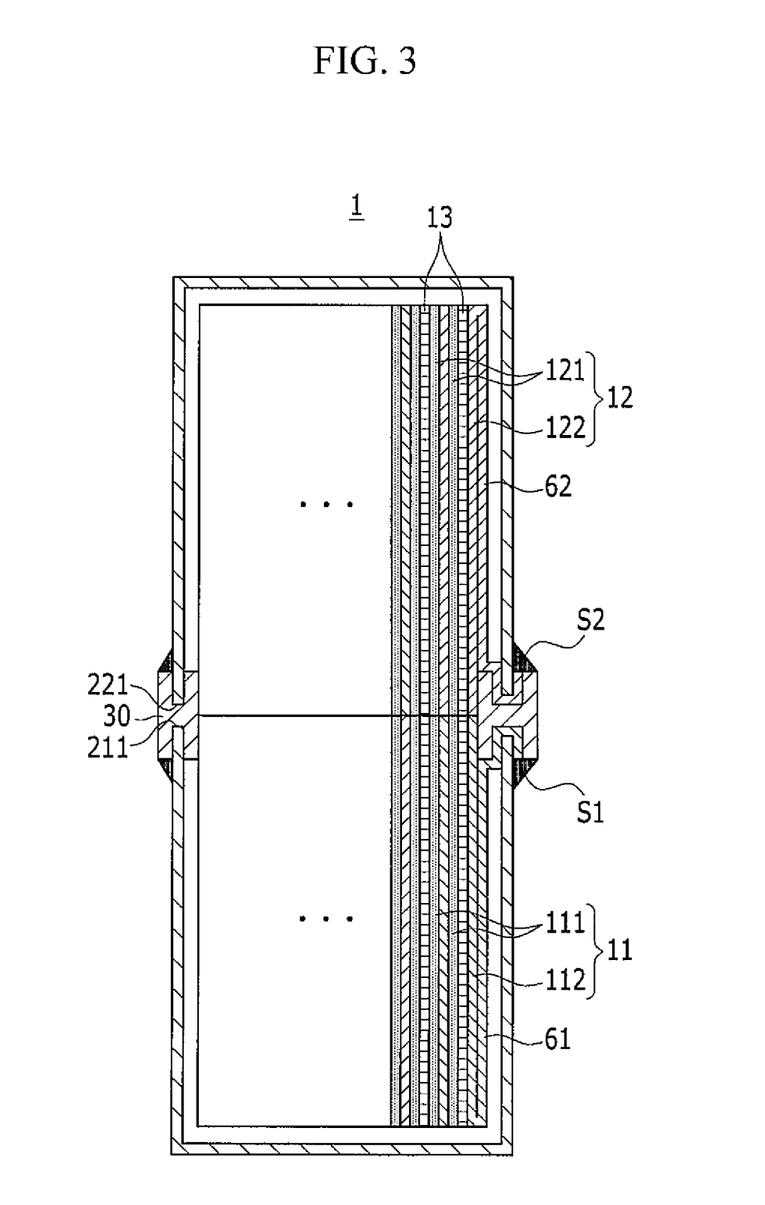
FIG. 3 is a cross-sectional view of FIG. 2 taken along the line III-III.
Figure 4:
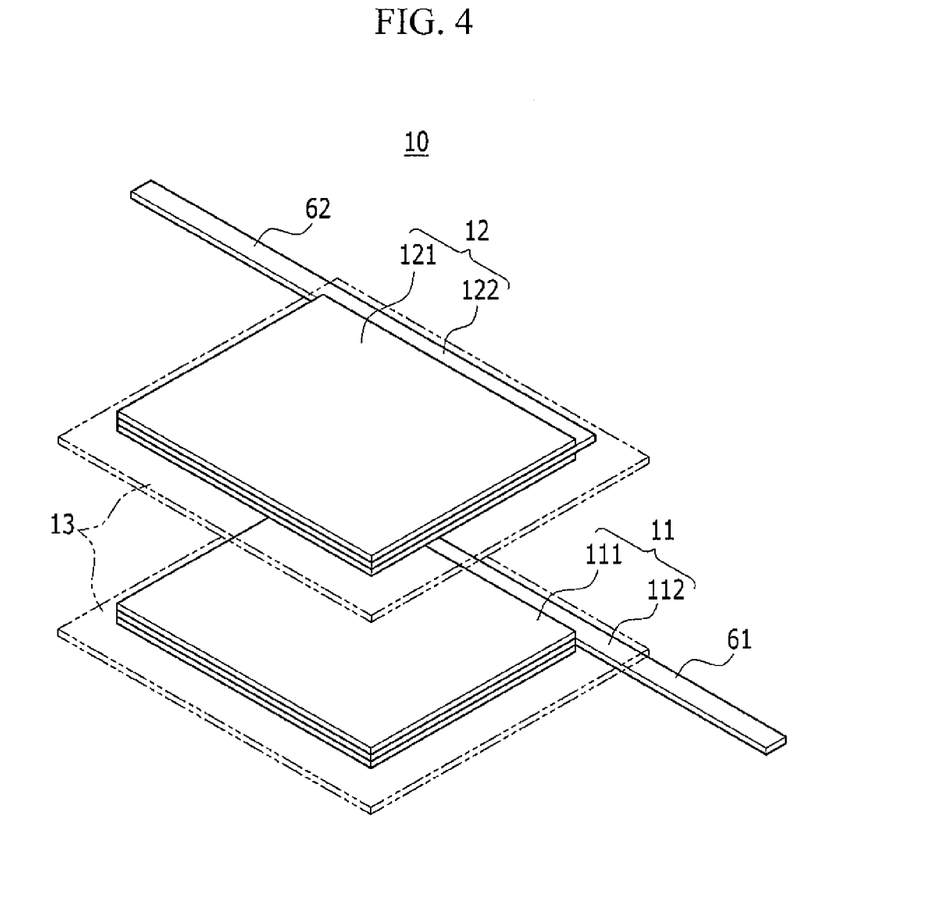
FIG. 4 is an exploded perspective view of an electrode assembly.

FIG. 3 is a cross-sectional view of FIG. 2 taken along the line and FIG. 4 is an exploded perspective view of an electrode assembly.

Referring to FIGS. 2, 3, and 4, the electrode assembly 10 includes a first electrode 11 and a second electrode 12 that are located at opposite sides of a separator 13 that extends between the electrodes.

The electrode assembly 10 is formed by winding the first electrode 11, the second electrode 12, and the separator 13, which is an insulator, in a jelly roll state.

For example, the first and second electrodes 11 and 12 between which the separator 13 is interposed may be wound two to five times around a core (to be removed after being wound).

The number of windings may be selected within two to five depending on a maximum diameter of the rechargeable battery 1 and thicknesses of the separator 13 and the first and second electrodes 11 and 12.

The number of windings is between two and five because a required capacity cannot be implemented when the first and second electrodes 11 and 12 are wound fewer than two times, and the diameter of the rechargeable battery 1 can exceed 5 mm when the first and second electrodes 11 and 12 are wound more than five times.

The first and second electrodes 11 and 12 include coated regions 111 and 121 where an active material is coated on opposite surfaces of a current collector formed of a thin metal foil (for example, copper and aluminum foils), and uncoated regions 112 and 122 where the active material is not coated thereon to expose the current collector.

A first tab 61 is coupled to the uncoated region 112 of the first electrode 11, and a second tab 62 is coupled to the uncoated region 122 of the second electrode 12.

In the first exemplary embodiment, the first and second tabs 61 and 62 are respectively integrally formed with and extended from the uncoated regions 112 and 122.

In one embodiment, the first and second tabs may be welded to the respective uncoated regions.

The first case 21 includes the first opening 211 at one side or end to accommodate one side of the electrode assembly 10, and the second case 22 includes the second opening 221 at one side or end to accommodate the other side of the electrode assembly 10.

In other words, the first and second cases 21 and 22 are formed to have a cylindrical shape so as to accommodate the cylindrical electrode assembly impregnated with an electrolyte solution.

The rechargeable battery 1 is formed as a pin type having an ultra-small diameter such that its outer diameter is set by the first and second cases 21 and 22.

In one embodiment, the first case 21 is formed of stainless steel and contacts the first tab 61 of the first electrode 11 to provide electrical connectivity.

Since welding is not involved, the first tab 61 and the first case 21 can effectively provide electrical connectivity even if both the first tab 61 and the first electrode 11 are formed of copper.

The second case 22 is formed of aluminum having relatively lower strength than the first case 21 and contacts the second tab 62 of the second electrode 12 to provide electrical connectivity.

In one embodiment, the second case 22 may more effectively provide electrical connectivity when it is formed of the same material as the second tab 62.

The gasket 30 is penetrated by the electrode assembly 10 and is combined to end portions of the first and second cases 21 and 22 through the first and second openings 211 and 221, thereby sealing the first and second openings 211 and 221.

Accordingly, the rechargeable battery 1 accommodating the electrode assembly 10 is assembled with the first and second cases 21 and 22 between which the gasket 30 is located.

The first tab 61 electrically couples the first electrode 11 of the electrode assembly 10 to the first case 21, while the second tab 62 electrically couples the second electrode 12 of the electrode assembly 10 to the second case 22.

Accordingly, in the rechargeable battery 1, the first case 21 serves as a terminal of the first electrode 11 and the second case 22 serves as a terminal of the second electrode 12.

In other words, since the rechargeable battery 1 of the first exemplary embodiment does not include an additional terminal and an insulator through which the terminal is drawn out, the number of parts may be reduced.

In addition, the rechargeable battery 1 may maximize use of internal spaces of the first and second cases 21 and 22 to accommodate the electrode assembly 10.

The first tab 61 is integrally formed with the uncoated region 112 of the first electrode 11 to be extended therefrom, and is bent at a lowermost end and a middle portion of the electrode assembly 10 to be coupled to an end portion of the first opening 211 of the first case 21.

The second tab 62 is integrally formed with the uncoated region 122 of the second electrode 12 to be extended therefrom, and is bent at an uppermost end and the middle portion of the electrode assembly 10 to be coupled to an end portion of the second opening 221 of the second case 22.

Figure 5:
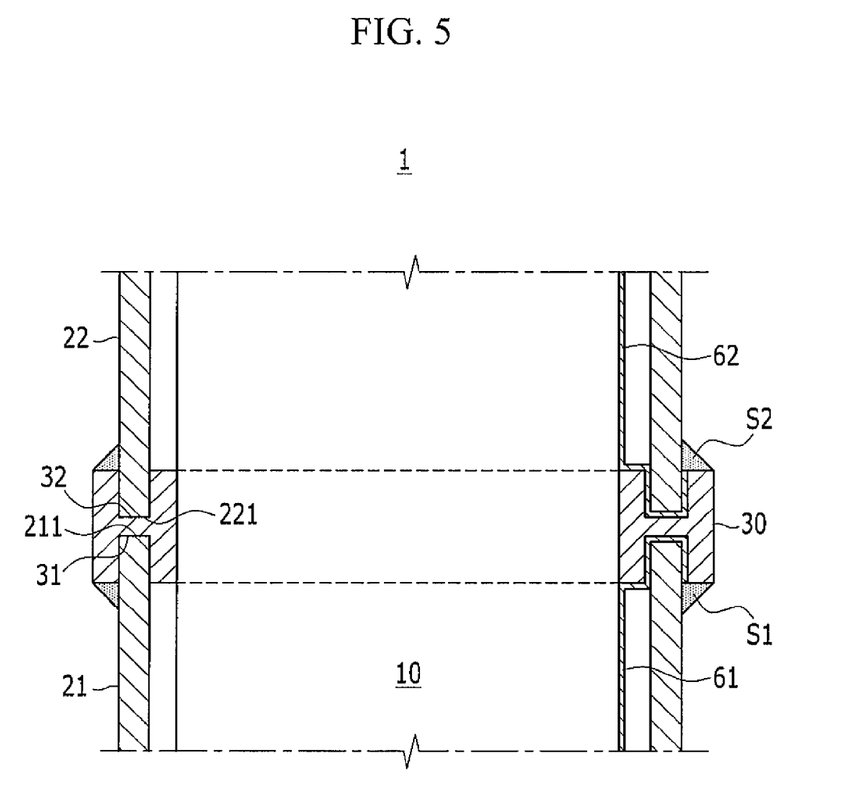
FIG. 5 is a cross-sectional detail view of a case combined with a gasket of FIG. 3.

FIG. 5 is a cross-sectional view of the case combined to the gasket of FIG. 3.

Referring to FIG. 5, the gasket 30 is formed to have a ring shape such that it is penetrated by the electrode assembly 10, and includes a first groove 31 and a second groove 32 at its opposite surfaces.

The first groove 31 is opened to face the end portion of the first case 21 that is set in the first opening 211 of the first case 21, while the second groove 32 is opened to face the end portion of the second case 22 that is set in the second opening 221 of the second case 22.

Accordingly, the first tab 61 is inserted into the first groove 31 along with the end portion of the first case 21 such that it is electrically coupled to the end portion of the first case 21.

The second tab 62 is inserted into the second groove 32 along with the end portion of the second case 22 such that it is electrically coupled to the end portion of the second case 22.

In other words, when the first tab 61 is bent, one side of the electrode assembly 10 is inserted into the first case 21, the first case 21 is combined to the first groove 31 of the gasket 30, and the first tab 61 and the end portion of the first case 21 are both inserted into the first groove 31 such that they are coupled to each other.

In this case, since the first tab 61 and the end portion of the first case 21 are forcedly fitted into the first groove 31 to be combined therewith, electrical connectivity and contact between the first tab 61 and the first case 21 can be stably maintained.

Subsequently, when the second tab 62 is bent, the other side of the electrode assembly 10 is inserted into the second case 22, the second case 22 is combined to the second groove 32 of the gasket 30, and the second tab 62 and the end portion of the second case 22 are both inserted into the second groove 32 of the gasket 30 such that they are coupled to each other.

In this case, since the second tab 62 and the end portion of the second case 22 are forcedly fitted into the second groove 32 to be combined therewith, electrical connectivity and contact between the second tab 62 and the second case 22 can be stably maintained.

Since the gasket 30 is formed of an electrical insulating material, it may insulate the first case 21 and the first tab 61 from the second case 22 and the second tab 62.

A first sealing portion S1 and a second sealing portion S2 that are formed by coating and then hardening an epoxy resin using ultraviolet rays may be further included around border lines where the opposite surfaces of the gasket 30 and the first and second cases 21 and 22 are combined.

The first and second sealing portions S1 and S2 further stabilize a sealing structure between the gasket 30 and the first and second cases 21 and 22.

As described above, a pin type of rechargeable battery 1 having an ultra-small diameter can be formed.

In addition, the gasket 30 is penetrated by the electrode assembly 10 and supports the electrode assembly 10 by inner circumferential surfaces, thereby preventing the electrode assembly 10 from being moved inside the first and second cases 21 and 22.

Various exemplary embodiments of the present invention will now be described, and the same configurations as those of the first exemplary embodiment and the aforementioned exemplary embodiment will be omitted, while different configurations will be described.

Figure 6:
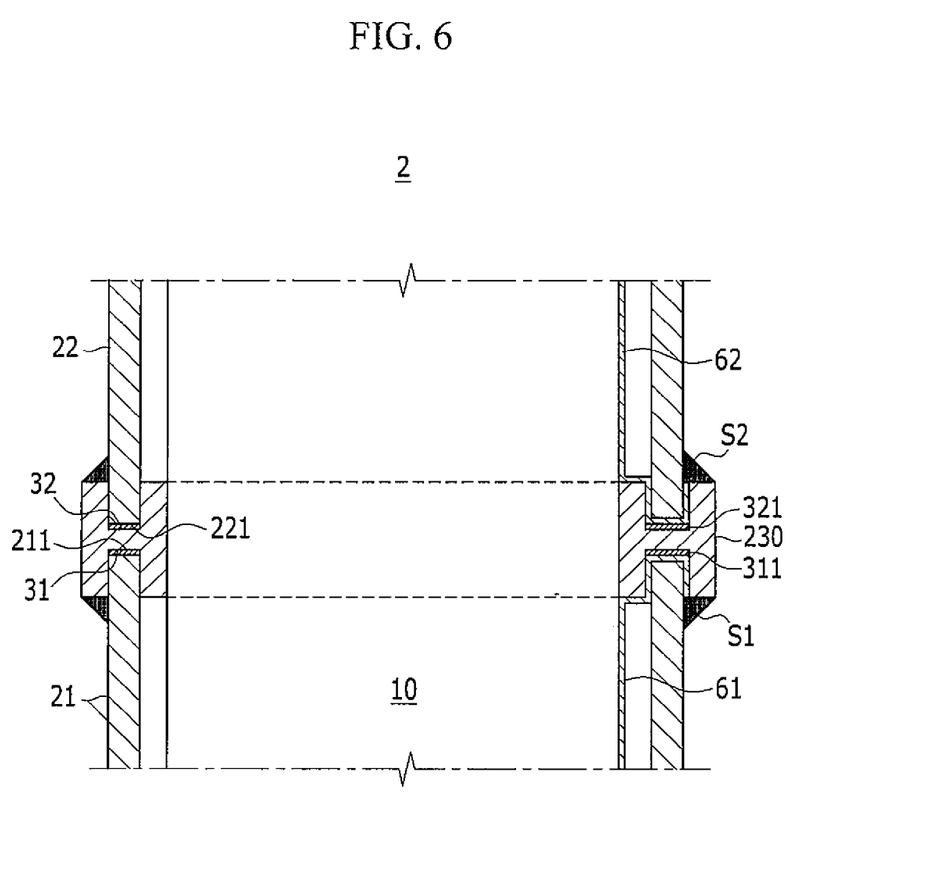
FIG. 6 is a cross-sectional detail view of a case combined with a gasket in a rechargeable battery according to a second exemplary embodiment of the present invention.

FIG. 6 is a cross-sectional view of a case combined to a gasket in a rechargeable battery according to a second exemplary embodiment of the present invention.

Referring to FIG. 6, in the rechargeable battery 2 according to the second exemplary embodiment, a gasket 230 further includes a first conductive member 311 in the first groove 31 and a second conductive member 321 in the second groove 32.

In other words, the first and second conductive members 311 and 321 are located at bottoms of the first and second grooves 31 and 32.

When the first tab 61 and the first case 21 are inserted into the first groove 31, the first tab 61 and the first case 21 are electrically coupled to each other while being supported by the first conductive member 311 in the first groove 31.

In other words, the first tab 61 may be directly coupled to the first case 21, or may be coupled to the first case 21 through the first conductive member 311 at one point in a circumferential direction.

Thus, electrical connectivity between the first tab 61 and the first case 21 can be more stably maintained.

When the second tab 62 and the second case 22 are inserted into the second groove 32, the second tab 62 and the second case 22 are electrically coupled to each other while being supported by the second conductive member 321 in the second groove 32.

In other words, the second tab 62 may be directly coupled to the second case 22, or may be coupled to the second case 21 through the second conductive member 321 at one point in the circumferential direction.

Accordingly, electrical connectivity between the second tab 62 and the second case 22 can be more stably maintained.

Figure 7:
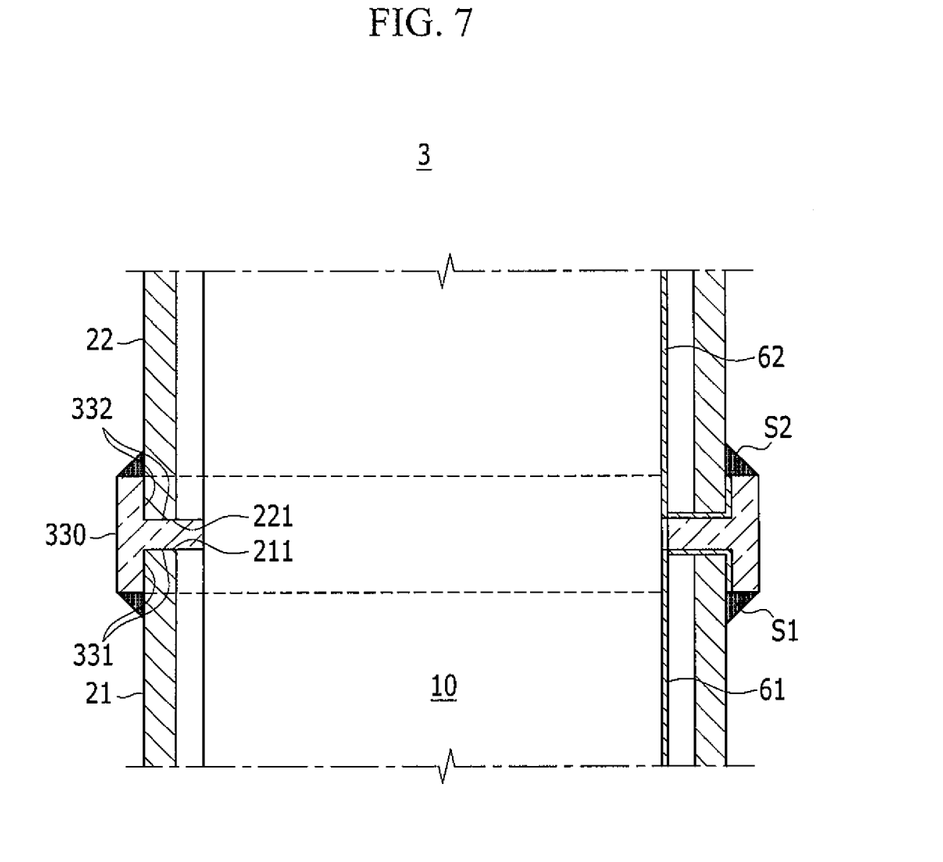
FIG. 7 is a cross-sectional detail view of a case combined with a gasket in a rechargeable battery according to a third exemplary embodiment of the present invention.

FIG. 7 is a cross-sectional view of a case combined with a gasket in a rechargeable battery according to a third exemplary embodiment of the present invention.

Referring to FIG. 7, in the rechargeable battery 3 according to the third exemplary embodiment, a first groove 331 and a second groove 332 of a gasket 330 is formed to be stepped.

The first groove 331 is formed to be stepped toward the end portion of the first case 21 and a lateral side of the electrode assembly 10.

The second groove 332 is formed to be stepped toward the end portion of the second case 22 and the side of the electrode assembly 10.

Thus, inner circumferential surfaces of the gasket 330 formed with the first and second grooves 331 and 332 face the electrode assembly 10.

When the first tab 61 and the first case 21 are combined to the first groove 331, the first tab 61 and the first case 21 are supported by bottom and lateral sides of the first groove 331.

In this case, the first tab 61 and the first case 21 may be electrically coupled to each other at the bottom and the lateral sides of the first groove 331.

When the second tab 62 and the second case 22 are combined to the second groove 332, the second tab 62 and the second case 22 are supported by bottom and lateral sides of the second groove 332.

In this case, the second tab 62 and the second case 22 may be electrically coupled to each other at the bottom and the lateral sides of the second groove 332.

Figure 8:
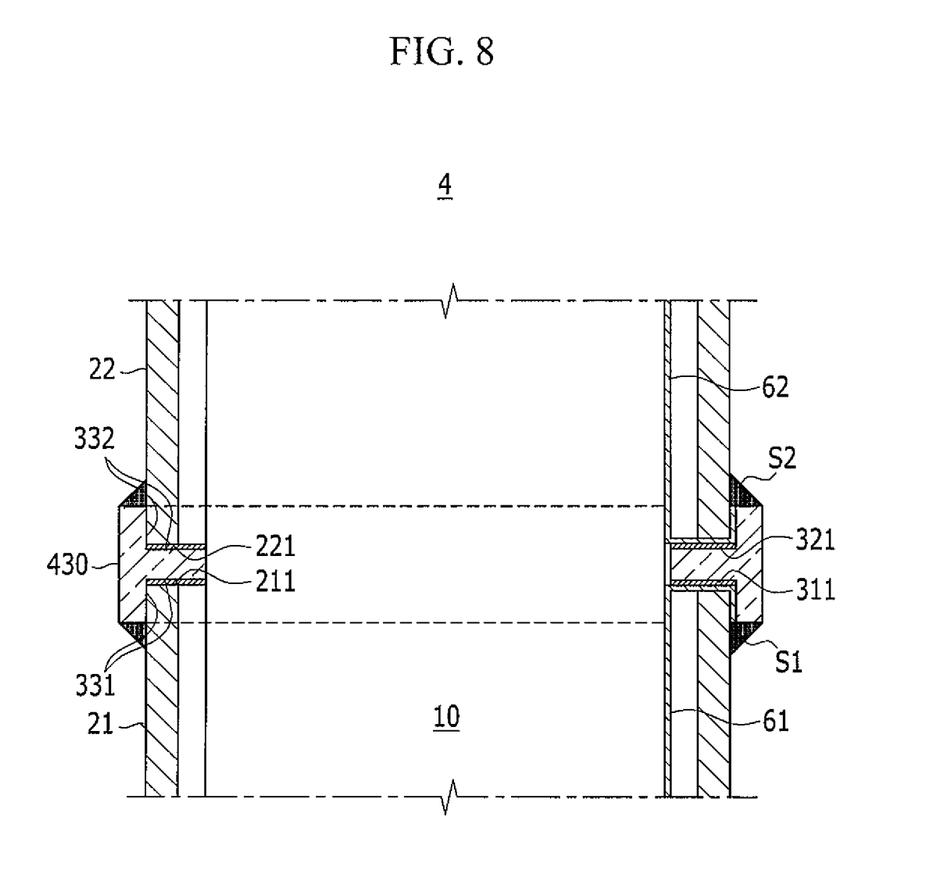
FIG. 8 is a cross-sectional detail view of a case combined with a gasket in a rechargeable battery according to a fourth exemplary embodiment of the present invention.

FIG. 8 is a cross-sectional view of a case combined with a gasket in a rechargeable battery according to a fourth exemplary embodiment of the present invention.

Referring to FIG. 8, in the rechargeable battery 4 according to the fourth exemplary embodiment, a gasket 430 further includes a first conductive member 311 at a bottom of the first groove 331 and a second conductive member 321 at a bottom of the second groove 332.

When the first tab 61 and the first case 21 are combined to the first groove 331, the first tab 61 and the first case 21 are electrically coupled to each other while being supported by bottom and lateral sides of the first groove 331 and the first conductive member 311 in the first groove 331.

In other words, the first tab 61 may be directly coupled to the first case 21, or may be coupled to the first case 21 through the first conductive member 311 at one point in a circumferential direction.

Accordingly, electrical connectivity between the first tab 61 and the first case 21 can be more stably maintained.

When the second tab 62 and the second case 22 are combined to the second groove 332, the second tab 62 and the second case 22 are electrically coupled to each other while being supported by bottom and lateral sides of the second groove 332 and the second conductive member 321 in the second groove 332.

In other words, the second tab 62 may be directly coupled to the second case 22, or may be coupled to the second case 22 through the second conductive member 321 at one point in the circumferential direction.

Accordingly, electrical connectivity between the second tab 62 and the second case 22 may be more stably maintained.

Figure 9:
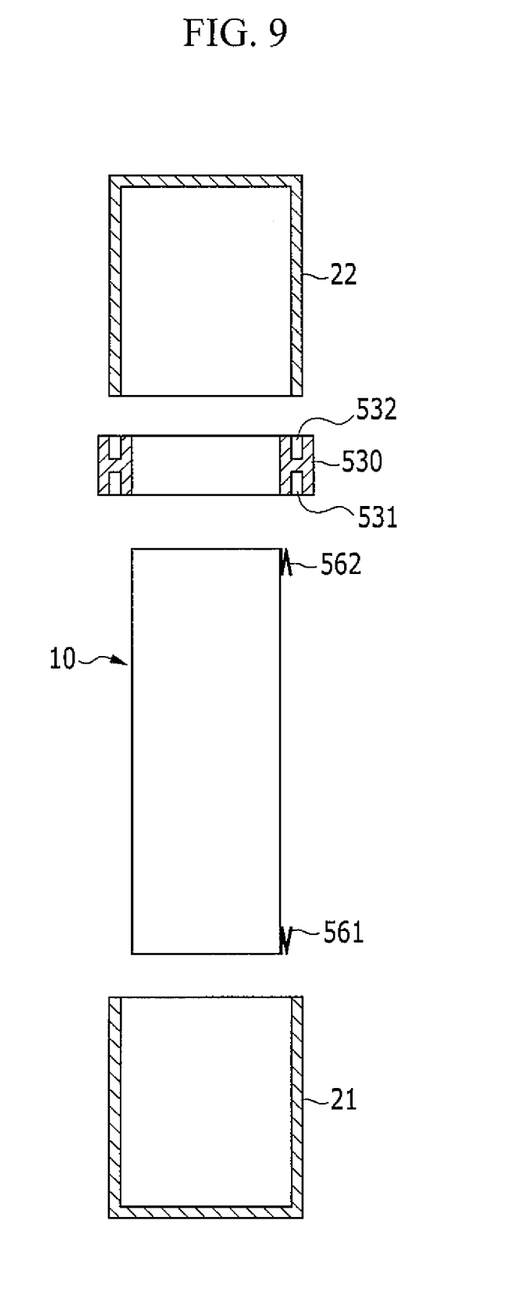
FIG. 9 is an exploded cross-sectional view of a rechargeable battery according to a fifth exemplary embodiment of the present invention.
Figure 10:
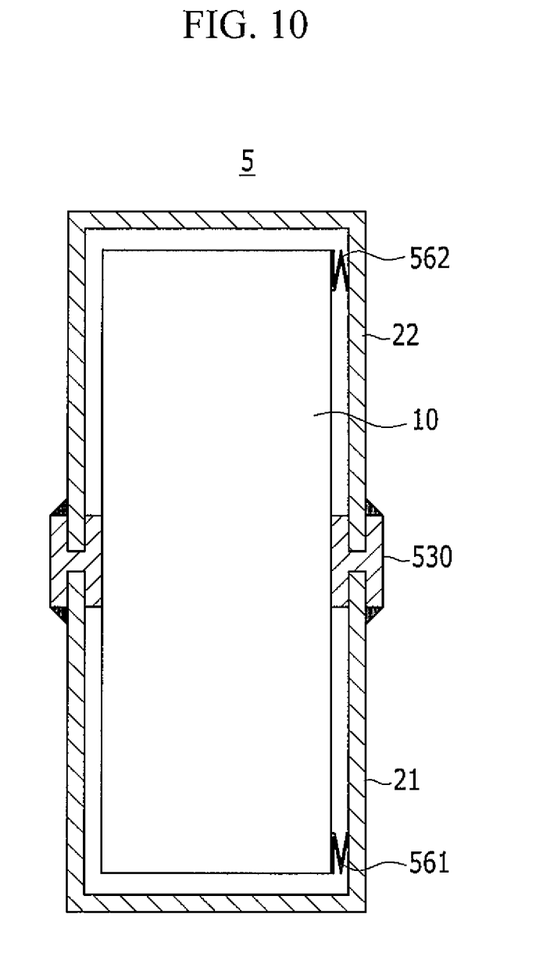
FIG. 10 is a cross-sectional view illustrating a combined state of FIG. 9.

FIG. 9 is an exploded cross-sectional view of a rechargeable battery according to a fifth exemplary embodiment of the present invention, and FIG. 10 is a cross-sectional view illustrating a combined state of FIG. 9.

Referring to FIGS. 9 and 10, in the rechargeable battery 5 according to the fifth exemplary embodiment, a first tab 561 and a second tab 562 are bent multiple times.

The first tab 561 is bent multiple times to elastically contact an inner side of the first case 21 at a lateral side of the electrode assembly 10.

The second tab 562 is bent multiple times to elastically contact an inner surface of the second case 22 at a lateral side of the electrode assembly 10.

When the bent first tab 561 is inserted into the first case 21 along with the electrode assembly 10 and the end portion of the first case 21 is then combined to a first groove 531 of a gasket 530, the first tab 561 is electrically coupled to the first case 21 while being compressively supported by the inner side of the first case 21.

When the bent second tab 562 is inserted into the second case 22 along with the electrode assembly 10 and the end portion of the second case 22 is then combined to a second groove 532 of the gasket 530, the second tab 562 is electrically coupled to the second case 22 while being compressively supported by the inner side of the second case 22.

Since the first and second tabs 561 and 562 are elastically supported by the inner sides of the first and second cases 21 and 22 while being compressed, electrical connectivity between the first and second tabs 561 and 562 and the first and second cases 21 and 22 may be more stably maintained.

Figure 11:
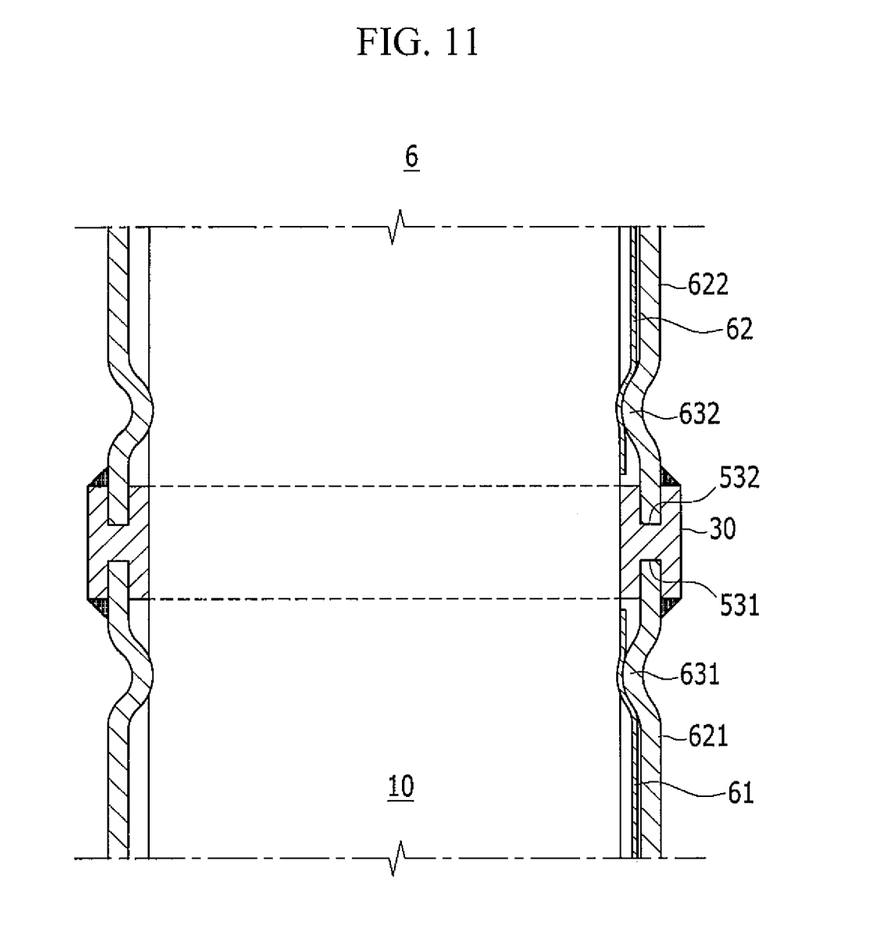
FIG. 11 is a cross-sectional detail view of a case combined with a gasket in a rechargeable battery according to a sixth exemplary embodiment of the present invention.

FIG. 11 is a cross-sectional view of a case combined with a gasket in a rechargeable battery according to a sixth exemplary embodiment of the present invention.

Referring to FIG. 11, in the rechargeable battery 6 of the sixth exemplary embodiment, a first case 621 and a second case 622 respectively include a first beading portion 631 and a second beading portion 632.

An inner side of the first case 621 contacts the first tab 61 through the first beading portion 631 such that they are electrically coupled to each other.

An inner side of the second case 622 contacts the second tab 62 through the second beading portion 632 such that they are electrically coupled to each other.

For example, when a crimping process is performed while one side of the electrode assembly 10 is inserted into the first case 621, the end portion of the first case 621 is combined to the first groove 531 of the gasket 530, the other side of the electrode assembly 10 is inserted into the second case 622, and the end portion of the second case 622 is combined to the second groove 532 of the gasket 530, the first and second beading portions 631 and 632 are respectively formed at the end portions of the first and second cases 621 and 622.

The first and second beading portions 631 and 632 are depressed toward a diametrical center at the end portions of the first and second cases 631 and 632 to be tightly attached to the first and second tabs 61 and 62.

Accordingly, electrical connectivity between the first and second cases 621 and 622 and the first and second tabs 61 and 62 can be stably maintained.

In addition, the first and second beading portions 631 and 632 prevent the electrode assembly 10 from being moved inside the first and second cases 621 and 622.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

- 1, 2, 3, 4, 5, 6: rechargeable battery 10: electrode assembly
- 11: first electrode 12: second electrode
- 13: separator 21, 621: first case
- 22, 622: second case 30, 230, 330, 430, 530: gasket
- 31, 331: first groove 32, 332: second groove
- 61, 561: first tab 62, 562: second tab
- 111, 121: coated region 112, 122: uncoated region
- 211: first opening 221: second opening
- 311, 321: first, second conductive member
- 631, 632: first, second beading portion
- S1, S2: first, second sealing portion

What is claimed is:

1. A rechargeable battery comprising:
   a wound electrode assembly comprising first and second electrodes at opposite surfaces of a separator;
   a first case accommodating a first side of the electrode assembly and being coupled to the first electrode;
   a second case accommodating a second side of the electrode assembly and coupled to the second electrode; and
   a gasket engaged by the electrode assembly and combined at first and second openings to seal the first and second openings.

2. The rechargeable battery of claim 1, wherein the first case is coupled to the first electrode through a first tab, and wherein the second case is coupled to the second electrode through a second tab.

3. The rechargeable battery of claim 2, wherein the first tab is integrally formed with and extends from an uncoated region of the first electrode and is bent such that it is coupled to an end portion of the first case at the first opening, and wherein the second tab is integrally formed with and extends from an uncoated region of the second electrode and is bent such that it is coupled to an end portion of the second case at the second opening.

4. The rechargeable battery of claim 2, wherein the gasket has a first groove that faces an end portion of the first case, and a second groove that faces an end portion of the second case.

5. The rechargeable battery of claim 4, wherein the first tab and the first case are electrically coupled to each other in the first groove, and the second tab and the second case are electrically coupled to each other in the second groove.

6. The rechargeable battery of claim 2, wherein the gasket further includes a first conductive member in a first groove that faces an end portion of the first case and a second conductive member in a second groove that faces an end portion of the second case.

7. The rechargeable battery of claim 6, wherein the first tab and the first case are electrically coupled to each other in the first groove while being supported by the first conductive member, and wherein the second tab and the second case are electrically coupled to each other in the second groove while being supported by the second conductive member.

8. The rechargeable battery of claim 2, wherein the gasket includes a first groove that is stepped towards an end portion of the first case and lateral sides of the electrode assembly, and a second groove that is stepped towards an end portion of the second case and lateral sides of the electrode assembly.

9. The rechargeable battery of claim 8, wherein the first tab and the first case are electrically coupled to each other at bottom and lateral sides of the first groove, and wherein the second tab and the second case are electrically coupled to each other at bottom and lateral sides of the second groove.

10. The rechargeable battery of claim 2, wherein the gasket further includes a first conductive member at a bottom of a first groove that is stepped towards an end portion of the first case and lateral sides of the electrode assembly, and a second conductive member at a bottom of a second groove that is stepped towards an end portion of the second case and the lateral sides of the electrode assembly.

11. The rechargeable battery of claim 10, wherein the first tab and the first case are electrically coupled to each other in the first groove while being supported by the bottom and the lateral sides thereof and the first conductive member, and wherein the second tab and the second case are electrically coupled to each other in the second groove while being supported by the bottom and the lateral sides thereof and the second conductive member.

12. The rechargeable battery of claim 2, wherein the first tab is bent multiple times at a lateral side of the electrode assembly to elastically contact an inner surface of the first case, and wherein the second tab is bent multiple times at the lateral side of the electrode assembly to elastically contact an inner surface of the second case.

13. The rechargeable battery of claim 2, wherein the first case is electrically coupled to the first tab through a first beading portion that is depressed toward a diametrical center, and wherein the second case is electrically coupled to the second tab through a second beading portion that is depressed toward the diametrical center.

14. The rechargeable battery of claim 1, wherein a current collector of the first electrode comprises copper, wherein a current collector of the second electrode comprises aluminum, wherein the first case comprises stainless steel to contact a first tab of the first electrode, and wherein the second case comprises aluminum to contact a second tab of the second electrode.

* * * * *